US010106441B2

(12) United States Patent
Matani

(10) Patent No.: US 10,106,441 B2
(45) Date of Patent: Oct. 23, 2018

(54) SUBMERSIBLE DESALINATION APPARATUS

(71) Applicant: University of Dammam, Dammam (SA)

(72) Inventor: Abdelaziz Samih Matani, Dammam (SA)

(73) Assignee: University of Dammam, Dammam (SA)

( * ) Notice: Subject to any disclaimer, the term of this patent is extended or adjusted under 35 U.S.C. 154(b) by 121 days.

(21) Appl. No.: 15/258,525

(22) Filed: Sep. 7, 2016

(65) Prior Publication Data
US 2018/0065866 A1 Mar. 8, 2018

(51) Int. Cl.
*B01D 61/08* (2006.01)
*B01D 63/00* (2006.01)
*B01D 71/04* (2006.01)
*B01D 71/80* (2006.01)
*B01D 69/10* (2006.01)
(Continued)

(52) U.S. Cl.
CPC ............ *C02F 1/441* (2013.01); *B01D 61/025* (2013.01); *B01D 61/08* (2013.01); *B01D 69/10* (2013.01); *B01D 69/148* (2013.01); *B01D 71/021* (2013.01); *B01D 71/022* (2013.01); *B01D 71/04* (2013.01); *B01D 71/78* (2013.01); *B01D 71/80* (2013.01); *B01D 2311/14* (2013.01); *B01D 2313/06* (2013.01); *B01D 2313/18* (2013.01); *B01D 2313/20* (2013.01); *B01D 2313/243* (2013.01); *B01D 2315/06* (2013.01); *B01D 2319/02* (2013.01); *B01D 2325/02* (2013.01); *B01D 2325/021* (2013.01); *B01D 2325/34* (2013.01); *B01D 2325/36* (2013.01); *C02F 2103/08* (2013.01)

(58) Field of Classification Search
CPC ...... C02F 1/441; C02F 2103/08; C02F 1/442; B01D 61/025; B01D 61/08; B01D 2313/243; B01D 69/10; B01D 2315/06; B01D 69/12; B01D 2317/08
See application file for complete search history.

(56) References Cited

U.S. PATENT DOCUMENTS 3,126,830 A * 3/1964 Dilliner .................. B01D 63/00
3,156,645 A * 11/1964 Chapin .................. B01D 61/08
210/120
(Continued)

FOREIGN PATENT DOCUMENTS

AU 2008203793 B2 5/2011

*Primary Examiner* — Ana Fortuna
(74) *Attorney, Agent, or Firm* — Oblon, McClelland, Maier & Neustadt, L.L.P.

(57) ABSTRACT

A desalination apparatus and a method of desalinating thereof, wherein the desalination apparatus comprises a perforated vessel and at least one engineered semi-permeable membrane that covers perforations on the perforated vessel, wherein the desalination apparatus forms a purified water from saline water when submerged in the saline water to a depth of 50-250 m to create sufficient pressure differential on both sides of the engineered semi-permeable membrane, wherein low-saline water flows through the engineered semi-permeable membrane and collected within an internal cavity of the desalination apparatus. Various embodiments of the desalination apparatus and the method of desalinating are also provided.

17 Claims, 1 Drawing Sheet

(51) Int. Cl.
*B01D 71/02* (2006.01)
*C02F 1/44* (2006.01)
*B01D 61/02* (2006.01)
*B01D 71/78* (2006.01)
*B01D 69/14* (2006.01)
*C02F 103/08* (2006.01)

(56) References Cited

U.S. PATENT DOCUMENTS

| | | | | |
|---|---|---|---|---|
| 3,171,808 A | * | 3/1965 | Todd | B01D 61/08 203/DIG. 17 |
| 4,421,461 A | * | 12/1983 | Hicks | B01D 61/10 417/53 |
| 4,452,696 A | * | 6/1984 | Lopez | B01D 61/08 210/170.11 |
| 4,740,301 A | * | 4/1988 | Lopez | B01D 61/08 210/321.87 |
| 4,770,775 A | * | 9/1988 | Lopez | B01D 61/08 210/321.83 |
| 5,229,005 A | * | 7/1993 | Fok | B01D 61/10 210/652 |
| 5,366,635 A | * | 11/1994 | Watkins | B01D 61/10 210/651 |
| 5,512,886 A | * | 4/1996 | Macko | G08B 5/228 340/7.54 |
| 6,348,148 B1 | * | 2/2002 | Bosley | B01D 61/10 210/170.11 |
| 7,094,341 B2 | | 8/2006 | Max | |
| 8,029,857 B2 | * | 10/2011 | Hoek | B01D 67/0079 210/490 |
| 9,212,068 B2 | | 12/2015 | Mock et al. | |
| 9,808,737 B2 | * | 11/2017 | Hsia | B01D 1/0005 |
| 2010/0237016 A1 | | 9/2010 | Vuong | |
| 2010/0276369 A1 | | 11/2010 | Haag | |
| 2012/0241373 A1 | * | 9/2012 | Na | B01D 69/12 210/500.38 |
| 2016/0303524 A1 | * | 10/2016 | Bano | C02F 1/442 |

* cited by examiner

SUBMERSIBLE DESALINATION APPARATUS

BACKGROUND OF THE INVENTION

Technical Field

The present invention relates to a desalination apparatus and a method of use thereof, wherein the desalination apparatus comprises a perforated vessel and one or more semi-permeable membranes that cover perforations on the perforated vessel. In one mode, the desalination apparatus operates by use of a pressure differential across both sides of the semi-permeable membranes whereby low-saline water flows through the semi-permeable membranes and is collected within an internal cavity.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Nearly 96.5% of earth's water is located in seas and oceans and 1.7% of earth's water is located in ice caps. Approximately 0.8% is considered to be fresh water. Water shortage affects many communities, and thus production of fresh water has become a worldwide concern. Researchers have long searched for a solution to the shortage of fresh water. Considering the fact that a large portion of the water resources on earth is located in seas and oceans, efforts have been directed towards an economical pathway of desalinating seawater.

Accordingly, desalination of seawater has become an important source of drinking water production. Desalination is the process of removing salt from water to produce fresh water. Fresh water is defined as water containing less than 5,000 ppm of salts or total dissolved solids. Desalination processes are classified in two main categories, including thermal processes or membrane processes.

While investigations have been conducted towards thermal desalination, membrane desalination processes have gained interest. Reverse osmosis (RO) is one of the most popular and inexpensive membrane desalination processes used. Reverse osmosis is capable of rejecting nearly all colloidal or dissolved matter from an aqueous solution, thereby separating brine from purified water via a semi-permeable membrane. Semi-permeable membranes are water permeable, while concurrently impermeable to other dissolved substances. Some RO membranes are capable of rejecting mono-valent ions, such as sodium and chloride, whereas some other RO membranes have salt rejections of greater than 99%. A relatively large pressure differential across a semi-permeable membrane is required to overcome the osmotic pressure of the colloidal or dissolved matter in an aqueous solution and to allow pure water to flow through the membrane. For example, for water having a salinity of about 35 g/L, a pressure differential of about 40-50 bars across a membrane is required to provide a satisfactory rate of purified water production. The pressure differential of 40-50 bars is equivalent to a water level of about 450-500 m.

Although desalination of seawater using reverse osmosis is widespread, the need for a technology that directly turns seawater into purified water, preferably at shallow depths of seawater, is necessary. The importance of a portable apparatus that could make fresh water from seawater, particular in remote locations where access to desalination systems is restricted, is important. Previous investigations are dedicated towards reverse osmotic desalination system/apparatus for the purpose of desalinating seawater. Accordingly, the US20100276369A1 reference discloses a reverse osmotic desalination system having a number of semi-permeable membranes installed on a plurality of cartridges, such that when the desalination system is submersed in seawater and to a certain depth, where the hydrostatic pressure is larger than the osmotic pressure, the saline water flows through the semi-permeable membranes to form a desalinated water that is collected in the cavity. Further, the U.S. Pat. No. 9,212,068B2 reference discloses a water purification device with variable internal volume, wherein the filtering area is located on a portion of the surface of the water purification device. Upon submersing the device in a body of water, water diffuses in through the filters causing the device to expand, wherein the purified water is collected in the internal volume of the expanded device. Moreover, the US20100237016A1 reference relates to a water treatment system which includes a set of membrane modules and a collection channel. When the membrane modules are submerged to a specific depth in seawater, the hydrostatic pressure causes the seawater to cross the membranes, and therefore purified water is collected in the collection channel. In addition, the U.S. Pat. No. 4,452,696A reference discloses an immersion-type desalination apparatus for producing fresh water from seawater in shallow depth by reverse osmosis. Accordingly, the apparatus has a cavity which is fluidly connected to a piston and the cavity is filled with seawater before submersion. When the apparatus reaches a certain shallow depth, the piston generates an excessive compression on the saline water contained in the cavity, and raises the pressure of the saline water above its osmotic pressure leading the reverse osmosis to happen in a shallow depth.

In view of the forgoing, one objective of the present invention is to provide a desalination apparatus and a method of use thereof, wherein the desalination apparatus comprises a perforated vessel and one or more engineered semi-permeable membranes that cover perforations on the perforated vessel, and the desalination apparatus is configured to desalinate saline water at a shallow depth in the range of 50-250 m.

BRIEF SUMMARY OF THE INVENTION

According to a first aspect the present disclosure relates to a desalination apparatus, involving i) a vessel with a) an internal cavity, b) a port located proximal to a top of the vessel, and c) a valve that is attached to the port, ii) a plurality of perforations on at least a portion of the vessel, wherein the plurality of perforations fluidly connect the internal cavity to an exterior of the vessel, iii) a semi-permeable membrane that is secured on an external surface of the vessel and covers the plurality of perforations, wherein the semi-permeable membrane is selectively permeable to water, iv) a detachable vacuum pump that is connected to the port via a fluid line, wherein the detachable vacuum pump is configured to reduce a pressure within the internal cavity, and wherein the desalination apparatus is configured to form a purified water from saline water at a depth in the range of 50-250 m below a surface of the saline water.

In one embodiment, the desalination apparatus further includes a second semi-permeable membrane that is substantially similar to the semi-permeable membrane, wherein the second semi-permeable membrane is secured on an internal surface of the vessel and covers the plurality of perforations.

In one embodiment, the desalination apparatus further includes a mesh support secured on the semi-permeable membrane and/or the second semi-permeable membrane to provide mechanical support to the semi-permeable membrane and/or the second semi-permeable membrane.

In one embodiment, the semi-permeable membrane is a crosslinked polymer with an average molecular weight between crosslinks in the range of 200-10,000 g/mol. In one embodiment, the crosslinked polymer is grafted with a hydrophilic polymer.

In one embodiment, the semi-permeable membrane comprises artificial voids in a size range of 1-50 nm.

In one embodiment, the semi-permeable membrane is a block copolymer having a free volume fraction in the range of 0.1-15%.

In one embodiment, the semi-permeable membrane is a polymer composite that comprises a crosslinked polymer and at least one filler selected from the group consisting of glass fibers, carbon fibers, ceramic nanoparticles, metallic nanoparticles, polyhedral oligomeric silsesquioxane, carbon nanotubes, graphene sheets, and fullerene. In one embodiment, the at least one filler is covalently bonded to the crosslinked polymer.

In one embodiment, the plurality of perforations are substantially circular having a diameter in the range of 1-10 mm. In one embodiment, the plurality of perforations are filled with the semi-permeable membrane.

In one embodiment, the desalination apparatus further includes a) an aperture, b) a purified water line fluidly connected to the aperture, c) a second valve that is attached to the purified water line, and d) a submersible pump located within the internal cavity and is connected to the purified water line, wherein the submersible pump is configured to deliver the purified water to a storage location at the exterior of the vessel.

In one embodiment, the desalination apparatus further includes at least one propeller located on the external surface of the vessel, wherein the at least one propeller is configured to create fluid turbulence in the proximity of the external surface of the vessel.

In one embodiment, the desalination apparatus further includes a hook that is secured on the external surface and proximal to the top of the vessel and is configured to suspend the vessel by a suspension line.

In one embodiment, the desalination apparatus further includes a gas outlet port located proximal to the hook and a safety valve attached to the gas outlet port, wherein the safety valve is used to regulate the internal pressure of the vessel.

According to a second aspect the present disclosure relates to a method of desalinating saline water, involving i) reducing the pressure within the internal cavity of the desalination apparatus to a sub-atmospheric pressure via the detachable vacuum pump, ii) closing the valve and detaching the detachable vacuum pump from the vessel, iii) submersing the vessel to a depth below the surface of the saline water that produces a pressure differential that allows water to pass through the semi-permeable membrane, thereby forming a purified water having a lower salinity than the saline water, and collecting the purified water in the internal cavity of the vessel, iv) removing the vessel from the saline water.

In one embodiment, the vessel is submerged to a depth in the range of 50-250 m below the surface of the saline water.

In one embodiment, the method of desalinating saline water further involves moving the vessel after submersing the vessel to a depth below the surface of the saline water.

In one embodiment, the desalination apparatus further includes at least one propeller located on the external surface of the vessel, and the method further involves generating fluid turbulence in the proximity of the external surface of the vessel by switching the propeller to an on position.

In one embodiment, the method of desalinating saline water further involves pumping the purified water from the internal cavity of the vessel to a storage location at the exterior of the vessel with a submersible pump located within the internal cavity.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figures 1A, 1B:
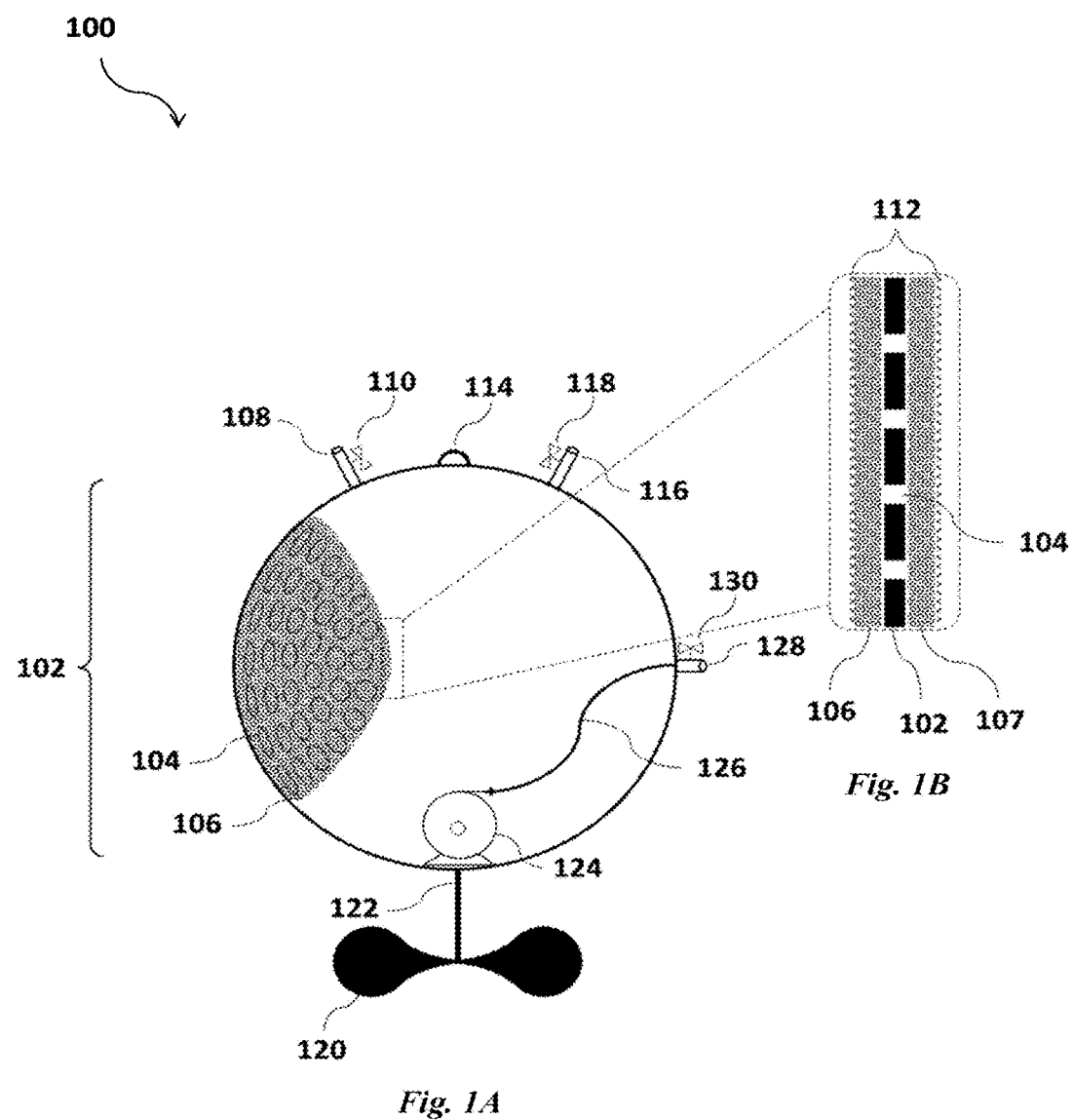
FIG. 1A is an illustration of a spherical desalination apparatus.
FIG. 1B is a side-view of a cross-section of a perforated section of the spherical desalination apparatus.

Referring now to the drawings, wherein like reference numerals designate identical or corresponding parts throughout the several views.

According to a first aspect the present disclosure relates to a desalination apparatus 100, involving a vessel 102 with an internal cavity, a port 108 located proximal to a top of the vessel, and a valve 110 that is attached to the port 108. The desalination apparatus 100 is configured to form purified water from saline water.

Desalination apparatus as used herein refers to an apparatus that is used to desalinate saline water, for example separate dissolved matter from an aqueous solution. Desalination refers to a process whereby minerals, salts, and ions (i.e. cations and anions) are partially or completely removed from saline water to produce water with lower salinity (i.e. lower concentration of salts, minerals, and ions). Exemplary salts include, but are not limited to sodium chloride, sodium bicarbonate, calcium chloride, potassium chloride, and magnesium chloride. In addition, exemplary anions include, but are not limited to chloride, sulfate, bromide, bicarbonate, borate, fluoride, iodide, phosphate, and nitrate. Exemplary cations also include, but are not limited to sodium, magnesium, calcium, potassium, and iron. Furthermore, traces of elements in salt or ionic form may also exist. Exemplary of these elements include, but are not limited to lithium, beryllium, fluorine, aluminum, silicon, sulfur, phosphorous, titanium, vanadium, chromium, manganese, iron, cobalt, copper, zinc, gallium, germanium, arsenic, selenium, zirconium, and niobium.

The "saline water" as used herein refers to water having a salt concentration of at least 5,000 ppm, preferably at least 10,000 ppm, more preferably at least 30,000 ppm at a temperature in the range of 20-30° C., preferably about 25° C. Accordingly, brackish water (i.e. water having a salt concentration in the range of 5,000-30,000 ppm at a temperature of about 25° C.), seawater (i.e. water having a salt concentration in the range of 30,000-50,000 ppm at a temperature of about 25° C.), and brine (i.e. water having a salt concentration of above 50,000 ppm at a temperature of about 25° C.) may be considered as saline water, and the desalination apparatus can be used on any water (e.g. brackish water, seawater, brine etc.) with a salt concentration of at least 5,000 ppm to form fresh water with a salt concentration of less than 5,000 ppm. Fresh water as used herein may refer to water having a salt concentration of less than 5,000 ppm, preferably less than 3,000, more preferably about less than 1,000 ppm at a temperature in the range of 20-30° C., preferably about 25° C. Sources of saline water include, but are not limited to water present in oceans/seas, bays, lakes, rivers, creeks, as well as underground water resources.

The vessel refers to a container that is designed to hold a fluid (i.e. gas and/or liquid). In one embodiment, the vessel 102 is made of a metal or a metal alloy, although the materials used to construct the vessel are not meant to be limiting and various other materials may also be used. Exemplary metal alloys include, but are not limited to stainless steel, nickel steel, chromium steel, aluminum, aluminum alloy, copper and copper alloys, and titanium. In a preferred embodiment, the vessel is made of a material having a density in the range of 1.5-10 g/cm$^3$, preferably 3-10 g/cm$^3$, more preferably 5-10 g/cm$^3$.

In a preferred embodiment, the vessel 102 is substantially spherical having an internal volume in the range of 10-50,000 L, or preferably 50-10,000 L, or preferably 100-5,000 L, or preferably 500-2,500 L. In another embodiment, the vessel is cylindrical having a length (L) in a preferable range of 0.1-5 m, or preferably 0.5-4 m, or preferably 1-2 m, and an internal diameter (D) in the range of 0.1-1 m, or preferably 0.1-0.5 m, or preferably 0.1-0.3 m, or preferably about 0.2 m. A relative ratio of the length to the inner diameter (L/D) of the vessel may be in the range of 5-20, preferably 8-12, preferably around 10. The vessel may also have a wall thickness in the range of 0.5-10 cm, or preferably 1-5 cm, or preferably about 3 cm. The vessel may also have other geometries including, but not limited to cylindrical, oblong, square, rectangular, conical, and pyramidal.

The vessel 102 further includes a port 108 located proximal to the top of the vessel. In one embodiment, the port refers to a passage that fluidly connects the internal cavity to an exterior of the vessel. In one embodiment, the port 108 is a cylindrical tube having an internal diameter in the range of 1-100 mm, preferably 10-50 mm, more preferably 20-40 mm, even more preferably about 25 mm, and is configured to be used as a passage to transfer a gas from the internal cavity to the exterior of the vessel. In a preferred embodiment, the port is made of a metal or a metal alloy and is welded to or is otherwise integral to the vessel.

According to one embodiment, the vessel 102 includes a hook, which is located on the top of the vessel, and therefore the location of the hook may be considered as the top of the vessel. Accordingly, "proximal to the top of the vessel" as used herein refers to a region on an external surface of the vessel having a distance of up to 50 cm, preferably 30 cm, more preferably up to 20 cm from the top of the vessel.

The vessel 102 further includes the valve 110 attached to the port 108. The valve may be a check valve, a diaphragm valve, or a shut valve, although the valve type is not meant to be limiting and various other type of valves may also be used. In one embodiment, the valve is utilized to close the port to prevent a change in vacuum level within the internal cavity of the vessel.

The desalination apparatus 100 further includes a plurality of perforations 104 on at least a portion of the vessel 102, wherein the plurality of perforations fluidly connect the internal cavity to the exterior of the vessel. In one embodiment, the plurality of perforations 104 cover at least 10%, preferably at least 20%, or preferably at least 30%, or preferably at least 40%, or preferably at least 50%, or preferably at least 60%, or preferably at least 70%, or preferably at least 80%, or preferably at least 90%, or preferably at least 95%, or preferably at least 99% of the surface area of the vessel 102. In one embodiment, perforations on the surface of the vessel are equally spaced apart. In another embodiment, perforations are located in specific sections of the vessel. For example, in a spherical vessel the perforations may be located at a 'south pole' and/or at a 'north pole', a strip around an 'equator', or a variety of vertically and/or horizontally separated sections, or any combination thereof 'North pole' and 'south pole' of the vessel as used herein may refer to regions at the top, and at the bottom of the vessel having surface areas of at least 5-50 cm$^2$, preferably 10-30 cm$^2$, or preferably 10-20 cm$^2$, more preferably about 15 cm$^2$, relative to the internal diameter of the vessel in the range of 0.1-1 m, or preferably 0.1-0.5 m, or preferably 0.1-0.3 m, or preferably about 0.2 m. Additionally, 'equator' as used herein may refer to a circumferential region on the vessel having equal distance from the 'north pole' and the 'south pole'. In a preferred embodiment, the perforations are substantially similar, preferably circular, having a diameter in the range of 1-10 mm, preferably 1-5 mm, more preferably about 2 mm. The perforations may also have other geometries including, but not limited to elliptical, hexagonal, square, rectangular, and triangular.

The desalination apparatus 100 further includes a semi-permeable membrane 106 that is secured on an external surface of the vessel 102 and covers the perforations 104. The semi-permeable membrane 106 may cover at least 10%, preferably at least 20%, or preferably at least 30%, or preferably at least 40%, or preferably at least 50%, or preferably at least 60%, or preferably at least 70%, or preferably at least 80%, or preferably at least 90%, or preferably at least 95%, or preferably at least 99% of the surface area of the vessel, with respect to the perforations that cover at least 10%, preferably at least 20%, or preferably at least 30%, or preferably at least 40%, or preferably at least 50%, or preferably at least 60%, or preferably at least 70%, or preferably at least 80%, or preferably at least 90%, or preferably at least 95%, or preferably at least 99% of the surface area of the vessel. For example, when 50% of the surface area of the vessel is perforated, the semi-permeable membrane also covers that 50% of the surface area of the vessel that is perforated. In another embodiment, the entire surface area of the vessel is covered with the semi-permeable membrane, regardless of how much of the surface area of the vessel is perforated. The semi-permeable membrane 106 may be adhered, e.g., glued, to the external surface of the vessel, or tightened in place with bolts and nuts having a rubber gasket therebetween to eliminate undesired leaking of saline water into the vessel, particularly under large hydrostatic pressures. In a preferred embodiment, the semi-permeable membrane is secured on an external surface of the vessel such that the vessel can bear a vacuum as low as 1 Torr, preferably as low as 5 Torr, even more preferably as low as 10 Torr, most preferably as low as 50 Torr. In one embodiment, the thickness of the semi-permeable membrane 106 is at least 5 mm, preferably at least 10 mm, or preferably at least 15 mm, or preferably at least 20 mm, or preferably at least 25 mm.

Semi-permeable membrane refers to a type of membrane that allows certain substances (i.e. a molecule or an ion) with a certain Stokes radius to pass through it by diffusion. Stokes radius of a substance in a membrane refers to the radius of a hard sphere that diffuses (passes through) the membrane at the same rate as that substance. Rate of passage of a substance through a semi-permeable membrane depends on the pressure, the temperature, and the concentration of the substance on both sides of the semi-permeable membrane, as well as the permeability of the semi-permeable membrane to that substance. Permeability of a semi-permeable membrane to a substance depends on the size (i.e. Stokes radius) of the substance, the solubility of the substance with respect to the semi-permeable membrane, and the structural properties of the semi-permeable membrane such as free volume fraction, porosity, etc.

The semi-permeable membrane 106 as used herein is selectively permeable to water. A semi-permeable membrane which is selectively permeable to water, only allows water molecules and any other molecules having smaller size (i.e. Stokes radius) than water molecules to pass through the membrane. Accordingly, "selectively permeable to water" as used herein may refer to a condition wherein any molecule having a size (i.e. Stokes radius) less than or equal to the size of a water molecule passes through the membrane, whereas bigger molecules, and preferably ions, cannot pass through the membrane. In a preferred embodiment, the semi-permeable membrane has a mass diffusivity in the range $10^{-10}$-$10^{-8}$ cm$^2$/s, preferably $5\times10^{-9}$-$10^{-8}$ cm$^2$/s, more preferably $10^{-9}$-$10^{-8}$ cm$^2$/s with respect to water molecules at a temperature below 30° C., preferably below 20° C., more preferably below 15° C., even more preferably below 10° C., most preferably below 5° C. In one embodiment, the semi-permeable membrane is at least 90%, preferably 92%, more preferably 95%, even more preferably 99% selective with respect to water molecules. In another embodiment, less than 10%, preferably less than 5%, more preferably less than 2%, most preferably less than 1% of substances present in saline water having larger Stokes radii than that of water can pass through the semi-permeable membrane at a temperature below 30° C., preferably below 20° C., more preferably below 15° C., even more preferably below 10° C., most preferably below 5° C.

In a preferred embodiment, the semi-permeable membrane 106 comprises or is made of a crosslinked polymer. Crosslinked polymers (i.e. thermosets) refer to a type of polymers that are formed upon curing monomer resins (i.e. constituent units of a polymer) having a functionality of more than two (i.e. having more than two reactive sites) to form a three-dimensional polymer network structure that cannot be reprocessed into a different shape upon heating without chemical degradation. The monomer resins that have a functionality of more than two are crosslinking points in the three-dimensional polymer network structure because the monomer resins covalently bond polymer chains together. In one embodiment the crosslinked polymer is a thermoplastic polymer wherein polymers chains are physically bonded together (e.g. entanglement) without being covalently bonded. The crosslinked polymer may form in a homo-polymerization reaction, wherein the monomer resins in the crosslinked polymer are substantially similar. The crosslinked polymer may also be formed in a polymerization reaction of at least two different monomer resins, wherein at least one has a functionality of more than two (i.e. has more than two reactive sites).

Exemplary crosslinked polymers include, but are not limited to epoxy, polyester, polyimide, polyamide-imides, polyurethane, phenolic polymers, bis-maleimide polymers, silicone rubber, and vulcanized rubber. One example of the crosslinked polymers is amine-cured epoxy systems. For example, a stoichiometric blend of an aliphatic epoxy resin (e.g. epoxidized polyethylene glycol) together with an aromatic amine hardener (e.g. diethyl toluene diamine) may be utilized. Alternatively, a stoichiometric blend of an aromatic epoxy resin (e.g. bisphenol-A based or bisphenol-F based epoxy) in conjunction with an aliphatic amine hardener (e.g. poly propylene-oxide amines, or poly ethylene-oxide amines) can be used. In each of these cases, the molecular weight of the epoxy resin and/or the amine hardener may vary, thus resulting in a cured epoxy system with a relatively homogenous network (i.e. a network having a narrow distribution of molecular weight between crosslinks) having a desirable molecular weight between crosslinks. Furthermore, the semi-permeable membrane 106 comprises or is made of at least one crosslinked polymer including, but is not limited to nylon 66, hexamethylenediamine-terephthalic acid, paraphenylenediamine-terephthalic acid, polyhexahydrotriazine, polyisocyanurate, polyglycolide, polylactic acid, polycaprolactone, polyhydroxyalkanoate, polyhydroxybutyrate, polyethylene adipate, polybutylene succinate, poly(3-hydroxybutyrate-co-3-hydroxyvalerate), polyethylene terephthalate, polybutylene terephthalate, polytrimethylene terephthalate, polyethylene naphthalate, and vinylester.

In a preferred embodiment, the crosslinked polymer has an average molecular weight between crosslinks in the range of 200-10,000 g/mol, preferably 2,000-5,000 g/mol, more preferably 3,000-5,000 g/mol, even more preferably 4,000-5,000 g/mol. The "average molecular weight between crosslinks" refers to an average molecular weight of a section of a polymer chain that lies between two crosslinking points. In one embodiment, the average molecular weight between crosslinks is varied by varying the monomer resin to prepare a crosslinked polymer that is selectively permeable to water.

In a preferred embodiment, the crosslinked polymer has a flexural strength in the range of 50-200 MPa, preferably 100-200 MPa, more preferably 150-200 MPa. In another embodiment, the crosslinked polymer linearly expands less than $10^{-6}$ cm, preferably less than $5\times10^{-7}$ cm, more preferably less than $10^{-7}$ cm per one degree Celsius. In a preferred embodiment, a glass transition temperature of the crosslinked polymer is in the range of 50 to 400° C., preferably 50 to 300° C., more preferably 50 to 200° C. In one embodiment, the crosslinked polymer is capable of swelling at least 0.1 wt %, or preferably at least 0.2 wt %, or preferably at least 0.5 wt %, or preferably at least 1 wt %, but no more than 2 wt % when immersed in water having a temperature below 30° C., preferably below 20° C., more preferably below 15° C., even more preferably below 10° C., most preferably below 5° C., for a period of 24 hours, with weight percent being based on an initial weight of the crosslinked polymer. In a preferred embodiment, the crosslinked polymer is grafted with a hydrophilic polymer to enhance water swelling of the crosslinked polymer. Grafting a hydrophilic polymer refers to a process whereby the hydrophilic polymer is covalently bound to the crosslinked polymer thus enhancing the water swelling of the crosslinked polymer. Grafting a hydrophilic polymer to a crosslinked polymer may be conducted via plasma treatment, UV treatment, and/or thermal treatment. In one embodiment, the crosslinked polymer when grafted with a hydrophilic polymer is capable of swelling at least 1 wt %, or preferably at least 1.5 wt %, or preferably at least 2 wt %, or preferably at least 2.5 wt %, or preferably at least 3 wt %, or preferably at least 4 wt %, or preferably at least 5 wt %, but no more than 10 wt % when immersed in water having a temperature below 30° C., preferably below 20° C., more preferably below 15° C., even more preferably below 10° C., most preferably below 5° C., for a period of 24 hours, with weight percent being based on an initial weight of the crosslinked polymer. In one embodiment, the hydrophilic polymer contains a polar or a charged functional group, allowing them to be soluble in water. Exemplary hydrophilic polymers that can be grafted to the crosslinked polymer include, but are not limited to polyacrylamide, poly(vinyl alcohol), poly(n-isopropylacrylamide), poly(2-oxazoline), polyethylenimine, poly(acrylic acid), poly(ethylene glycol), and poly(vinylpyrrolidone). In one embodiment, the hydrophilic polymer is coated on the crosslinked polymer having a coating thickness in the range of 1-5 mm, preferably 1-3 mm, more preferably about 2 mm, with respect to the thickness of the semi-permeable membrane which is at least 5 mm, preferably at least 10 mm, or preferably at least 15 mm, or preferably at least 20 mm, or preferably at least 25 mm.

In a preferred embodiment, the crosslinked polymer comprises artificial voids. Artificial voids as used herein refer to a type of voids that are not naturally occurring upon curing the crosslinked polymer, however, the artificial voids are fabricated throughout the three-dimensional polymer network structure of the crosslinked polymer. In one embodiment, the artificial voids are in a size range of 1-50 nm, preferably 5-50 nm, more preferably 5-nm, even more preferably 5-20 nm, most preferably 10-20 nm. In another embodiment, the artificial voids are dispersed within the three-dimensional polymer network structure of the crosslinked polymer such that the artificial voids are not aggregated to form bigger voids. In one embodiment, mass diffusivity of water molecules in a semi-permeable membrane which is made of a crosslinked polymer having artificial voids, is at least 10% higher, preferably at least 15% higher, more preferably at least 20% higher, but no more than 30% higher than a substantially similar semi-permeable membrane which is made of a crosslinked polymer having no artificial voids. The artificial voids may be fabricated by mixing an inert organic solvent with the monomer resins prior to curing the crosslinked polymer, followed by curing the monomer resins in the presence of the inert organic solvent, and finally removing the inert organic solvent from the crosslinked polymer after being fully cured via thermal-drying and/or supercritical extracting.

In one embodiment, the semi-permeable membrane 106 is a polymer composite that comprises the crosslinked polymer and at least one filler selected from the group consisting of glass fibers, carbon fibers, aramid fibers, Kevlar®, and thermoplastic fibers. Exemplary thermoplastic fibers include, but are not limited to nylon, polyamide, poly(phenylene sulfide), poly(etheretherketone), poly(etherketoneketone), poly(ethylenimine), polycarbonate, polypropylene, polyethylene, and thermoplastic polyurethane. In another embodiment, the semi-permeable membrane is a polymer composite that comprises the crosslinked polymer and one or more nanoparticles selected from the group consisting of ceramic nanoparticles, metallic nanoparticles, polyhedral oligomeric silsesquioxane, nano-diamonds, carbon nanotubes, graphene sheets, and fullerene, wherein a volume fraction of the nanoparticles is less than 5%, preferably less than 4%, or preferably less than 3%, or preferably less than 2%, or preferably less than 1%, or preferably less than 0.5%, or preferably less than 0.1% based on the total volume of the polymer composite. In one embodiment, the fillers are functionalized with reactive moieties, which are capable of forming covalent bonds to the crosslinked polymer, to form a filler-bonded polymer composite. For example, amine-functionalized glass fibers, carbon fibers, aramid fibers, or Kevlar® are capable of forming covalent bonds with epoxide groups present in an epoxy resin to form a filler-bonded epoxy composite. In another embodiment, the nanoparticles are functionalized with reactive moieties, which are capable of forming covalent bonds to the crosslinked polymer, to form a nanoparticle-bonded polymer composite. For example, amine-functionalized polyhedral oligomeric silsesquioxane (POSS), nano-diamonds, carbon nanotubes, graphene sheets, or fullerene are capable of forming covalent bonds with epoxide groups present in an epoxy resin to form a nanoparticle-bonded epoxy composite. Fillers such as carbon fibers, carbon nanotubes, graphene sheets, or fullerene may require an acid treatment, plasma treatment, and/or heat treatment prior to functionalization with reactive moieties. In a preferred embodiment, the polymer composite has a flexural strength in the range of 50-500 MPa, preferably 100-400 MPa, more preferably 200-350 MPa. In another embodiment, the polymer composite linearly expands less than $10^{-6}$ cm, preferably less than $5\times10^{-7}$ cm, more preferably less than $10^{-7}$ cm per one degree Celsius. In a preferred embodiment, glass transition temperature of the polymer composite is in the range of 50 to 400° C., preferably 50 to 300° C., more preferably 50 to 200° C. In one embodiment, the polymer composite is capable of swelling at least 0.1 wt %, or preferably at least 0.2 wt %, or preferably at least 0.5 wt %, or preferably at least 1 wt %, but no more than 2 wt % when immersed in water having a temperature below 30° C., preferably below 20° C., more preferably below 15° C., even more preferably below 10° C., most preferably below 5° C., for a period of 24 hours, with weight percent being based on an initial weight of the polymer composite. In a preferred embodiment, the polymer composite is grafted with the hydrophilic polymer as discussed previously. In one embodiment, the polymer composite when grafted with a hydrophilic polymer is capable of swelling at least 1 wt %, or preferably at least 1.5 wt %, or preferably at least 2 wt %, or preferably at least 2.5 wt %, or preferably at least 3 wt %, or preferably at least 4 wt %, or preferably at least 5 wt %, but no more than 10 wt % when immersed in water having a temperature below 30° C., preferably below 20° C., more preferably below 15° C., even more preferably below 10° C., most preferably below 5° C., for a period of 24 hours, with weight percent being based on an initial weight of the polymer composite. In one embodiment, the hydrophilic polymer contains a polar or a charged functional group, allowing them to be soluble in water. In one embodiment, the hydrophilic polymer is coated on the polymer composite having a coating thickness in the range of 1-5 mm, preferably 1-3 mm, more preferably about 2 mm.

In a preferred embodiment, the polymer composite comprises the artificial voids as discussed previously.

In one embodiment, the semi-permeable membrane 106 is a block copolymer having a repeating unit comprising one or more monomer type. In one embodiment, the semi-permeable membrane is a diblock copolymer having a repeating unit comprising A-block and B-block in a repeating sequence (e.g. $(A-A-A-A-A-B-B-B-B)_n$), wherein the A-block is a rigid phase and provides rigidity to the diblock copolymer, and the B-block is a soft phase that may turn into voids upon external stimulations (e.g. mechanical deformation etc.). In another embodiment, the semi-permeable membrane is a triblock copolymer having a repeating unit comprising A-block, B-block, and C-block in a repeating sequence (e.g. $(A-A-A-A-A-B-B-B-B-C-C-C-C-C)_n$), or a repeating unit comprising A-block and B-block in a repeating sequence (e.g. $(A-A-A-A-A-B-B-B-B-A-A-A-A-A)_n$). In a diblock copolymer, the A-block may preferably be polydimethylsiloxane or poly(l-trimethylsilyl-1-propyne), and the B-block may preferably be polyethylene.

In a preferred embodiment, a free volume fraction of the block copolymer is in the range of 0.1-15%, preferably 1-5%, more preferably 1-3%. Free volume fraction (or void fraction) is a measure of empty spaces in a polymeric material, and is a fraction of the volume of empty spaces (or voids) over the total volume of the polymeric material. Free volume fraction generally refers to naturally occurring voids in polymeric materials having a length scale in the range of 0.1-1.5 nm, preferably 0.5-1.5 nm, more preferably 0.5-1 nm. In one embodiment, addition of nanoparticles to the block copolymer increases the free volume fraction by at least 1%, or preferably at least 2%, or preferably at least 3%, or preferably at least 4%, or preferably at least 5%, or preferably at least 10%, but no more than 15%. Accordingly, in one embodiment, the block copolymer is filled with at least one nanoparticle selected from the group consisting of ceramic nanoparticles, metallic nanoparticles, polyhedral oligomeric silsesquioxane, carbon nanotubes, graphene sheets, and fullerene, wherein volume fraction of the nanoparticle is less than 5%, preferably less than 4%, or preferably less than 3%, or preferably less than 2%, or preferably less than 1%, or preferably less than 0.5%, or preferably less than 0.1%. In one embodiment, addition of nanoparticles to the block copolymer increases the naturally occurring voids having a length scale in the range of 0.1-1.5 nm, preferably 0.5-1.5 nm, more preferably 0.5-1 nm to voids having a length scale in the range of 1-5 nm, preferably 1.5-4 nm, more preferably 1.5-3 nm.

In a preferred embodiment, the block copolymer has a flexural strength in the range of 50-100 MPa, preferably 70-100 MPa, more preferably 80-100 MPa. In another embodiment, the block copolymer linearly expands less than $10^{-6}$ cm, preferably less than $5 \times 10^{-7}$ cm, more preferably less than $10^{-7}$ cm per one degree Celsius. In a preferred embodiment, glass transition temperature of the block copolymer is in the range of 50 to 200° C., preferably 50 to 150° C., more preferably 50 to 100° C. In one embodiment, the block copolymer is capable of swelling at least 0.5 wt %, or preferably at least 1 wt %, or preferably at least 2 wt %, or preferably at least 3 wt % water, but no more than 5 wt % when immersed in water having a temperature below 30° C., preferably below 20° C., more preferably below 15° C., even more preferably below 10° C., most preferably below 5° C., for a period of 24 hours, with weight percent being based on an initial weight of the block copolymer. In a preferred embodiment, the block copolymer is grafted with the hydrophilic polymer as discussed previously. Accordingly, the block copolymer when grafted with the hydrophilic polymer may be capable of swelling at least 1 wt %, or preferably at least 3 wt %, or preferably at least 5 wt %, or preferably at least 10 wt %, or preferably at least 12 wt %, or preferably at least 15 wt %, or preferably at least 20 wt %, but no more than 30 wt % when immersed in water having a temperature below 30° C., preferably below 20° C., more preferably below 15° C., even more preferably below 10° C., most preferably below 5° C., for a period of 24 hours, with weight percent being based on an initial weight of the block copolymer. The hydrophilic polymer coated on the block copolymer may have a coating thickness in the range of 1-5 mm, preferably 1-3 mm, more preferably about 2 mm.

In one embodiment, the desalination apparatus 100 further includes a second semi-permeable membrane 107 which is secured on an internal surface of the vessel and covers the plurality of perforations 104. The second semi-permeable membrane may cover at least 10%, preferably at least 20%, or preferably at least 30%, or preferably at least 40%, or preferably at least 50%, or preferably at least 60%, or preferably at least 70%, or preferably at least 80%, or preferably at least 90%, or preferably at least 95%, or preferably at least 99% of the internal surface of the vessel, with respect to the perforations that cover at least 10%, preferably at least 20%, or preferably at least 30%, or preferably at least 40%, or preferably at least 50%, or preferably at least 60%, or preferably at least 70%, or preferably at least 80%, or preferably at least 90%, or preferably at least 95%, or preferably at least 99% of the surface area of the vessel. The second semi-permeable membrane 107 may be glued to the internal surface of the vessel, or tightened in place with bolts and nuts having a rubber gasket therebetween to eliminate undesired leaking of saline water into the vessel, particularly under extremely large hydrostatic pressures. In one embodiment, the second semi-permeable membrane is substantially similar to the semi-permeable membrane. In a preferred embodiment, the semi-permeable membrane 106 is one of the polymer composite or the crosslinked polymer, and the second semi-permeable membrane 107 is the block copolymer. In another preferred embodiment, the second semi-permeable membrane 107 has a thickness which is less than 50%, preferably less than 40%, more preferably less than 30% of the thickness of the semi-permeable membrane. Each of the semi-permeable membrane and the second semi-permeable membrane may be in the form of a single layer or multiple stacked layers. In one embodiment, the semi-permeable membrane is made of a fiber-reinforced polymer composite having at least 4 layers, wherein fibers in successive layers are perpendicular to each other.

In one embodiment, the desalination apparatus 100 further includes a mesh support 112 secured on the semi-permeable membrane 106 and/or the second semi-permeable membrane 107 to provide mechanical support to the semi-permeable membrane and/or the second semi-permeable membrane. The mesh support 112 may be made of a metal or a metal alloy, such as stainless steel, nickel steel, chromium steel, aluminum, aluminum alloy, copper, copper alloy, titanium, or any combination thereof. In one embodiment, meshes in the mesh support are substantially similar having a hexagonal, square, rectangular, or triangular shape. In a preferred embodiment, the meshes are substantially similar, preferably square, having an edge length in the range of 2-20 mm, preferably 5-15 mm, more preferably about 10 mm. The mesh support may be welded on the external and/or internal surfaces of the vessel. In the embodiment of the spherical vessels, the mesh support has a substantially similar curvature to a curvature of the semi-permeable membrane, and so the mesh support is secured substantially parallel to the semi-permeable membrane. The mesh support may cover at least 10%, preferably at least 20%, or preferably at least 30%, or preferably at least 40%, or preferably at least 50%, or preferably at least 60%, or preferably at least 70%, or preferably at least 80%, or preferably at least 90%, or preferably at least 95%, or preferably at least 99% of the internal surface of the vessel, with respect to the perforations that cover at least 10%, preferably at least 20%, or preferably at least 30%, or preferably at least 40%, or preferably at least 50%, or preferably at least 60%, or preferably at least 70%, or preferably at least 80%, or preferably at least 90%, or preferably at least 95%, or more preferably the entire surface area of the vessel.

In one embodiment, the perforations 104 of the vessel are filled with the semi-permeable membrane. According to this embodiment, the semi-permeable membrane is a thermoplastic material that melts upon heating. The perforations of the vessel may be filled with a molten thermoplastic, followed by quenching the vessel. This procedure may leave behind a vessel having perforations that are filled with the thermoplastic material. Exemplary thermoplastic materials include, but are not limited to polyethylene, polypropylene, polyacrylamide, poly(vinyl alcohol), poly(n-isopropylacrylamide), poly(2-oxazoline), polyethylenimine, poly(acrylic acid), poly(ethylene glycol), poly(ethylene oxide), and poly(vinylpyrrolidone).

The desalination apparatus 100 further includes a detachable vacuum pump that is connected to the port via a fluid line. Vacuum pump refers to a device that removes gas molecules from a sealed container leaving behind a partial vacuum in the sealed container. The detachable vacuum pump as used herein refers to a vacuum pump that can be detached and reattached to the port via the fluid line. The detachable vacuum pump may be a momentum transfer pump, a regenerative pump, an entrapment pump, a venturi vacuum pump, or a steam ejector. In one embodiment, the detachable vacuum pump is configured to create a partial vacuum in the range of 1-50 kPa, preferably 5-40 kPa, more preferably 10-30 kPa, even more preferably 10-20 kPa within the internal cavity of the vessel. The fluid line is preferably a tubular passage that is configured to transport gas molecules from the interior to the exterior of the vessel. In one embodiment, the fluid line is made of a metal or an alloy which is designed to bear a vacuum as low as 1 Torr, preferably as low as 5 Torr, even more preferably as low as 10 Torr, most preferably as low as 50 Torr. In a preferred embodiment, the detachable vacuum pump is configured to remove air from the internal cavity, and not purified water. Further, the port is located on top of the vessel in order to avoid pumping out the purified water with the detachable vacuum pump.

In one embodiment, the desalination apparatus 100 includes an aperture 128, a purified water line 126 which is placed inside the aperture 128, a second valve 130 that is attached to the purified water line 126, and a submersible pump 124 located within the internal cavity and is connected to the purified water line 126, wherein the submersible pump 124 is configured to deliver the purified water to a storage location at the exterior of the vessel. Submersible pump refers to a device having a hermetically sealed motor coupled to a pump, thereby allowing the pump to be submerged in a body of water. In one embodiment, the aperture has a diameter in the range of 5-30 mm, preferably 5-15 mm, more preferably about 10 mm, with respect to an outer diameter of the purified water line which is in the range of 5-30 mm, preferably 5-15 mm, more preferably about 10 mm. The purified water line may be made of a metal or an alloy or a polymer (e.g. polyvinyl chloride). Internal and external surface area of the purified water line may be coated with a polymer (e.g. epoxy) if the purified water line is made of a metal. The submersible pump 124 and purified water line 126 are configured to pump the purified water from the interior to the exterior of the vessel with a flow rate in the range of 0.05-10 L/min, preferably 0.5-5 L/min, more preferably about 1 L/min. The purified water may be stored in the storage location which is located at the shore, on a boat, or a floating reservoir on the surface of the saline water. In addition, the second valve may be a gate valve or a globe valve and may also be used to control a flow rate of the purified water. The submersible pump may be battery operated.

In a preferred embodiment, the desalination apparatus includes a liquid level control system within the internal cavity, and the liquid level control system activates the submersible pump 124 when a level of the purified water within the internal cavity goes beyond a predetermined liquid level threshold. Further, the liquid level control system deactivates the submersible pump when the level of the purified water within the internal cavity falls below the predetermined liquid level threshold. When the desalination apparatus is submerged, the predetermined liquid level threshold may be at least 20%, preferably at least 30%, more preferably at least 50% of the height of the apparatus, with 0% being the bottom and 100% being the top of the apparatus.

In one embodiment, the desalination apparatus 100 further includes a hook 114 that is secured on the external surface and proximal to the top of the vessel 102 and is configured to suspend the vessel by a suspension line. The hook 114 may have a round shape, preferably circular, with a diameter of 5-20 cm, preferably 5-15 cm, more preferably about 10 cm. The hook is preferably welded to the top of the vessel and is optionally made of a metal or a metal alloy (e.g. stainless steel), although the materials used to construct the vessel are not meant to be limiting and various other materials may also be used. The suspension line may preferentially be a wire rope or a plastic rope having a diameter in the range of 1-3 cm, preferably 1-2 cm, more preferably about 2 cm. The hook and the suspension line are configured to hold a weight of up to at least 500 kg, preferably at least 1000 kg, more preferably at least 2000 kg.

In one embodiment, the desalination apparatus 100 further includes a gas outlet port 116 located proximal to the hook 114 and a safety valve 118 attached to the gas outlet port 116, wherein the safety valve is used to regulate the internal pressure of the vessel by opening the gas outlet port so that compressed gas molecules within the internal cavity of the vessel could egress the vessel in circumstances when excessive pressure is accumulated in the internal cavity.

In one embodiment, the desalination apparatus 100 further includes a propeller 120 located on the external surface of the vessel 102. The propeller 120 is configured to create fluid turbulence in the proximity of the external surface of the vessel to prevent accumulation of highly saline water therein. In one embodiment, the propeller 120 is attached to the vessel via a shaft 122. In another embodiment, the propeller is manually switched on and off. In a preferred embodiment, the propeller is connected to a control system, and the control system turns the propeller on and off in a regular time interval. For example, in one embodiment, the control system turns on the propeller and keeps it on for 1 min, and then turns off the propeller and keeps it off for 10 min, in a cyclic manner. In a preferred embodiment, propeller blades and the shaft are made of stainless steel, nickel steel, chromium steel, copper alloys, and/or titanium, and optionally coated with epoxy to prevent corrosion. The propeller may be battery operated.

The "proximity of the external surface of the vessel" as used herein refers to a region of up to 30 cm, preferably up to 20 cm, more preferably up to 10 cm surrounding the external surface of the vessel.

According to a second aspect the present disclosure relates to a method of desalinating saline water, involving reducing the pressure within the internal cavity of the desalination apparatus 100 to a sub-atmospheric pressure via the detachable vacuum pump. The detachable vacuum pump reduces pressure to the sub-atmospheric pressure that is in the range of 1-100 Torr, preferably 5-100 Torr, or preferably 10-100 Torr, or preferably 30-100 Torr, or preferably 50-100 Torr, or preferably 70-100 Torr, or preferably about 80 Torr. The sub-atmospheric pressure below 100 Torr within the internal cavity of the desalination apparatus may create sufficient pressure differential across both sides of the semi-permeable membrane to overcome an osmotic pressure of the saline water and to provide reverse osmosis to happen at a depth of at least 50 m, preferably at least 100 m, more preferably at least 150 m, but no more than 250 m below the surface of the saline water. Upon reducing the pressure within the internal cavity, a gradual air flow through the semi-permeable membrane begins; therefore, it may be best to submerge the vessel as soon as the pressure within the internal cavity is reduced to the sub-atmospheric pressure. In one embodiment, a time between reducing the pressure and submersing the vessel is less than 5 mins, preferably less than 2 mins, more preferably less than 1 min. The pressure within the internal cavity may be increased by less than 20 Torr, preferably less than 10 Torr, more preferably less than 5 Torr.

The method of desalinating saline water further involves closing the valve 110 and detaching the detachable vacuum pump from the vessel 102. When the valve 110 is closed, the vessel may hold the vacuum within the internal cavity without a need for the detachable vacuum pump. Therefore, the detachable vacuum pump and the fluid line may be separated from the port 108 on the vessel, leaving behind the vessel having the sub-atmospheric pressure therein.

The method of desalinating saline water further involves submersing the vessel 102 to a depth below the surface of the saline water. As discussed previously, the vessel is preferably made of a metal alloy having a density in a range of 5-10 g/cm$^3$. Although the pressure within the internal cavity is reduced, a total density (i.e. total mass of the vessel/total volume of the vessel) is at least 1.5 g/cm$^3$, preferably at least 3 g/cm$^3$, more preferably at least 5 g/cm$^3$, and therefore the vessel sinks. In one embodiment, submersing involves attaching the suspension line to the hook 114 and sinking the vessel in the saline water, while one end of the suspension line is secured to a structure above the surface of the saline water. Accordingly, the vessel is submersed to a depth of at least 50 m, preferably at least 100 m, more preferably at least 150 m, but no more than 250 m below the surface of the saline water. The depth may create sufficient pressure differential on both sides of the semi-permeable membrane to overcome the osmotic pressure of the saline water, and to form the purified water having a lower salinity than the saline water. The purified water is further collected in the internal cavity of the vessel.

In one embodiment, the desalination apparatus further includes at least one propeller 120 located on the external surface of the vessel, and the method further involves generating fluid turbulence in the proximity of the external surface of the vessel by switching the propeller to an on position in a regular time interval using a time controller. The time controller may be a control system comprising a timer, a processing unit, and an actuator, wherein the processing unit activates the actuator based on a time interval it receives from the timer. In one embodiment, the time controller and the propeller may be battery operated.

In one embodiment, in the absence of the propeller 120, the method involves moving the vessel when it is submersed, in order to prevent accumulation of salt deposits from the saline water in the proximity of the external surface of the vessel. In one embodiment, the vessel movement can be manually controlled by the suspension line from above the surface of the saline water. The moving may be in linear or preferably radial direction with a speed of no more than 10 m/min, preferably no more than 5 m/min, more preferably no more than 3 m/min.

The method of desalinating saline water further involves removing the vessel 102 from the saline water by pulling the suspension line, followed by pumping out the purified water collected within the internal cavity via the port 108.

In one embodiment, the method of desalinating saline water involves pumping the purified water from the internal cavity of the vessel to the storage location at the exterior of the vessel without the need for removing the vessel from the saline water. Pumping the purified water to the storage location at the exterior of the vessel may be conducted via the submersible pump 124 located within the internal cavity.

The invention claimed is:

1. A desalination apparatus, comprising:
a vessel with an internal cavity, a port located proximal to a top of the vessel, and a valve that is attached to the port;
a plurality of perforations on at least a portion of the vessel, wherein the plurality of perforations fluidly connect the internal cavity to an exterior of the vessel;
a first semi-permeable membrane that is secured on an external surface of the vessel and covers and fills the plurality of perforations, wherein the first semi-permeable membrane is selectively permeable to water; and
a detachable vacuum pump that is connected to the port via a fluid line, wherein the detachable vacuum pump is configured to reduce a pressure within the internal cavity, and
wherein the desalination apparatus is configured to form a purified water from saline water at a depth in the range of 30-150 m below a surface of the saline water.

2. The desalination apparatus of claim 1, wherein the first semi-permeable membrane is made of a crosslinked polymer with an average molecular weight between crosslinks in the range of 200-10,000 g/mol.

3. The desalination apparatus of claim 2, wherein the crosslinked polymer is grafted with a hydrophilic polymer.

4. The desalination apparatus of claim 1, wherein the first semi-permeable membrane comprises voids in a size range of 1-50 nm.

5. The desalination apparatus of claim 1, wherein the first semi-permeable membrane is a polymer composite that comprises a crosslinked polymer and at least one filler selected from the group consisting of glass fibers, carbon fibers, ceramic nanoparticles, metallic nanoparticles, polyhedral oligomeric silsesquioxane, carbon nanotubes, graphene sheets, and fullerene.

6. The desalination apparatus of claim 5, wherein the at least one filler is covalently bonded to the crosslinked polymer.

7. The desalination apparatus of claim 1, wherein the plurality of perforations are substantially circular having a diameter in the range of 1-10 mm.

8. The desalination apparatus of claim 1, further comprising:
an aperture, a purified water line fluidly connected to the aperture, and a second valve that is attached to the purified water line; and
a submersible pump located within the internal cavity and is connected to the purified water line, wherein the submersible pump is configured to deliver the purified water to a storage location at the exterior of the vessel.

9. A method of desalinating saline water, comprising:
reducing the pressure within the internal cavity of the desalination apparatus of claim 1 to a sub-atmospheric pressure via the detachable vacuum pump;
closing the valve and detaching the detachable vacuum pump from the vessel;
submersing the vessel to a depth below a surface of the saline water that produces a pressure differential that allows water to pass through the first semi-permeable membrane, thereby forming a purified water having a lower salinity than the saline water, and collecting the purified water in the internal cavity of the vessel; and
removing the vessel from the saline water.

10. The method of claim 9, wherein the vessel is submerged to a depth in the range of 50-250 m below the surface of the saline water.

11. The method of claim 9, further comprising:
moving the vessel after submersing the vessel to a depth below the surface of the saline water.

12. The method of claim 9, wherein the desalination apparatus further comprises at least one propeller located on the external surface of the vessel, and the method further comprises generating fluid turbulence in the proximity of the external surface of the vessel by switching the propeller to an on position.

13. The method of claim 9, further comprising:
pumping the purified water from the internal cavity of the vessel to a storage location at the exterior of the vessel with a submersible pump located within the internal cavity.

14. A desalination apparatus, comprising:
a vessel with an internal cavity, a port located proximal to a top of the vessel, and a valve that is attached to the port;
a plurality of perforations on at least a portion of the vessel, wherein the plurality of perforations fluidly connect the internal cavity to an exterior of the vessel;
a first semi-permeable membrane made of a block copolymer having a free volume fraction in the range of 0.1-15% that is secured on an external surface of the vessel and covers the plurality of perforations, wherein the first semi-permeable membrane is selectively permeable to water; and
a detachable vacuum pump that is connected to the port via a fluid line, wherein the detachable vacuum pump is configured to reduce a pressure within the internal cavity, and
wherein the desalination apparatus is configured to form a purified water from saline water at a depth in the range of 30-150 m below a surface of the saline water.

15. A desalination apparatus, comprising:
a vessel with an internal cavity, a port located proximal to a top of the vessel, and a valve that is attached to the port;
a plurality of perforations on at least a portion of the vessel, wherein the plurality of perforations fluidly connect the internal cavity to an exterior of the vessel;
a first semi-permeable membrane that is secured on an external surface of the vessel and covers the plurality of perforations, wherein the first semi-permeable membrane is selectively permeable to water;
a detachable vacuum pump that is connected to the port via a fluid line, wherein the detachable vacuum pump is configured to reduce a pressure within the internal cavity, and
at least one propeller located on the external surface of the vessel, wherein the at least one propeller is configured to create fluid turbulence in the proximity of the external surface of the vessel;
wherein the desalination apparatus is configured to form a purified water from saline water at a depth in the range of 30-150 m below a surface of the saline water.

16. The desalination apparatus of claim 1, further comprising:
a hook that is secured on the external surface and proximal to the top of the vessel and is configured to suspend the vessel by a suspension line.

17. The desalination apparatus of claim 16, further comprising:
a gas outlet port located proximal to the hook and a safety valve attached to the gas outlet port, wherein the safety valve regulates the internal pressure of the vessel.

* * * * *